F. G. WHITTINGTON.
AUTOMOBILE BUMPER.
APPLICATION FILED OCT. 2, 1920.

1,381,151.  Patented June 14, 1921.

WITNESS:

INVENTOR
Frederik G. Whittington
BY
HIS ATTORNEYS

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,381,151.

Specification of Letters Patent.   Patented June 14, 1921.

Application filed October 2, 1920.   Serial No. 414,298.

*To all whom it may concern:*

Be it known that I, FREDERIK G. WHITTINGTON, a citizen of the United States, residing at the city of Chicago, in the county of Cook and the State of Illinois, have invented certain new and useful Improvements in Automobile-Bumpers, of which the following is a specification, reference being had to the accompanying drawings, forming a part thereof.

The purpose of this invention is to provide an improved construction of automobile bumper of simpler and less expensive construction than those of similar character in general use. It consists in the elements and features of construction shown and described, as indicated in the claims.

Figure 2:
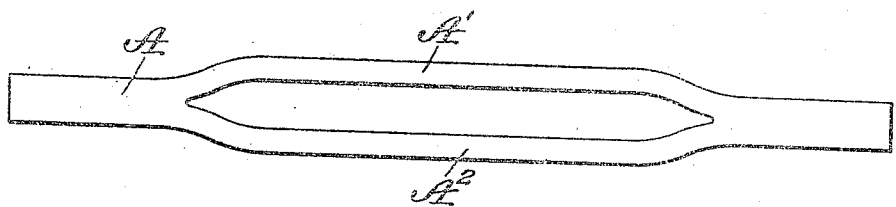
Fig. 2 is a front elevation of the same.
Figure 1:
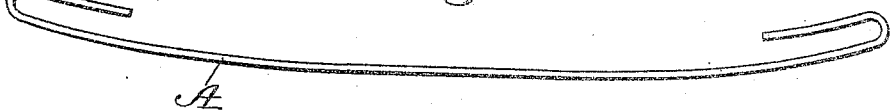
Figure 1 is a plan view of a bumper impact bar embodying this invention.

It is well known that the common form of bumpers applied to automobiles are liable to be mounted, and are in fact mounted, at varying degrees of distance from the ground on different cars, and that the forward bumper of one car driven up against another car having a rear bumper may be positioned higher or lower than said rear bumper so that the two bumpers will not come into contact, and thereby the protection which they are intended to provide for their respective cars is not obtained as perfectly as the strength and resiliency of the bumpers is adapted to cause. A specific purpose of the present invention is to give to the impact bar of the bumper a vertical extent adequate to cover the variation in level of different bumpers upon other cars with which it may be liable to come in contact, so that the bumpers shall collide instead of passing by each other in the manner above suggested. For this purpose and in accomplishing the purpose to avoid unduly increasing the amount of metal used and thereby the weight of the impact bar, it is made of a single piece of flat metal, A, having the opposite ends reflexed rearwardly and inwardly to form the desired inwardly-open resilient loops or hooks, and having the middle portion of the length of the bar rifted longitudinally and spread apart at the rift to form upper and lower impact bars, $A^1$ and $A^2$, spaced apart vertically from each other by a distance which is relatively small but sufficient to make the total range from the upper edge of the upper part to the lower edge of the lower part as great as the commonly observed difference in level of bumper bars as ordinarily mounted upon different cars.

It is to be understood that this impact bar may be carried on supporting arms or other means extended from the car in any usual, customary or desired manner, and such supporting arms or like means are not shown in any form.

I claim:—

An automobile bumper impact member consisting of an integral flat bar, longitudinally rifted at the middle part of its length and spaced apart at the rift to form an upper and a lower impact bar; end portions beyond the rifted and spread parts being reflexed rearwardly and extended inwardly behind the under part to form resilient end loops.

In testimony whereof, I have hereunto set my hand at Chicago, Illinois, this 30th day of September, 1920.

FREDERIK G. WHITTINGTON.